United States Patent [19]

Bobbitt

[11] 4,285,052
[45] Aug. 18, 1981

[54] ROLL-ALONG SWITCH

[75] Inventor: John T. Bobbitt, Houston, Tex.

[73] Assignee: Litton Resources Systems, Inc., Houston, Tex.

[21] Appl. No.: 60,710

[22] Filed: Jul. 26, 1979

[51] Int. Cl.³ .............................................. G01V 1/22
[52] U.S. Cl. ........................................ 367/79; 367/56; 367/63; 367/60; 370/112; 370/113
[58] Field of Search ....................... 367/56, 58, 59, 63, 367/78, 79, 60; 370/80, 112, 113; 328/104, 137, 154

[56] References Cited

U.S. PATENT DOCUMENTS

| | | | |
|---|---|---|---|
| 3,539,983 | 11/1970 | Burg | 367/56 |
| 4,017,687 | 4/1977 | Hartzler et al. | 367/112 |
| 4,072,923 | 2/1978 | Sienis et al. | 367/78 |
| 4,122,311 | 10/1978 | Klalt et al. | 367/112 |

Primary Examiner—Howard A. Birmiel
Attorney, Agent, or Firm—William A. Knox

[57] ABSTRACT

The electronic roll-along switch consists of several input multiplexers, each having a number of inputs that are connected to seismic detectors, and an output line. A plurality of multiple-input sample-and-hold modules are provided. Corresponding inputs of the respective sample-and-hold modules are paralleled. The output lines of the input multiplexers are connected in consecutive order to the paralleled input of the sample-and-hold modules. The output of each sample-and-hold module is connected to an output amplifier which is couplable to a multichannel seismic recording system. A master controller provides circuitry for connecting any set of several seismic detectors to a like number of channels in the seismic recording system.

8 Claims, 7 Drawing Figures

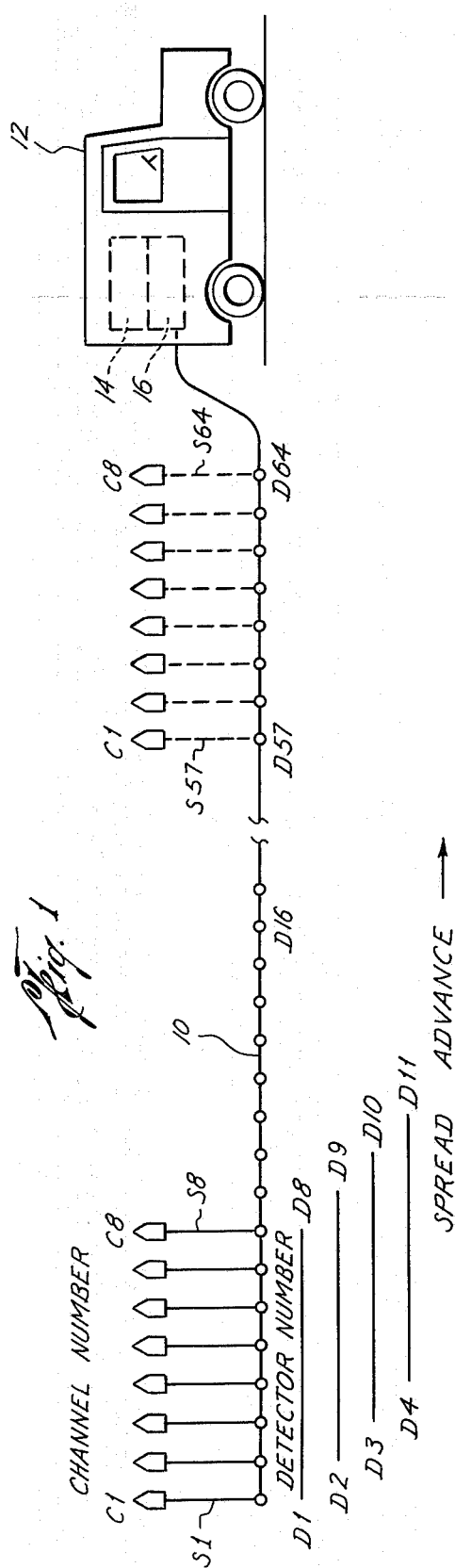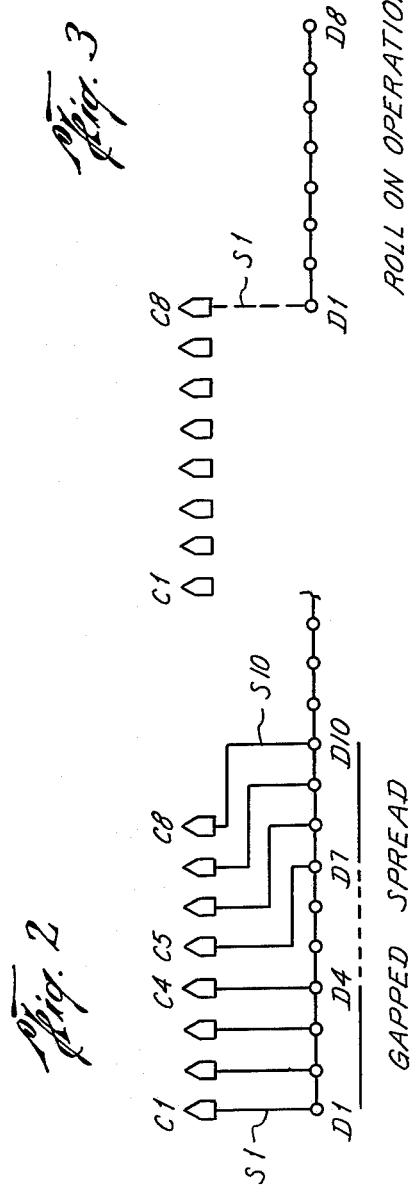

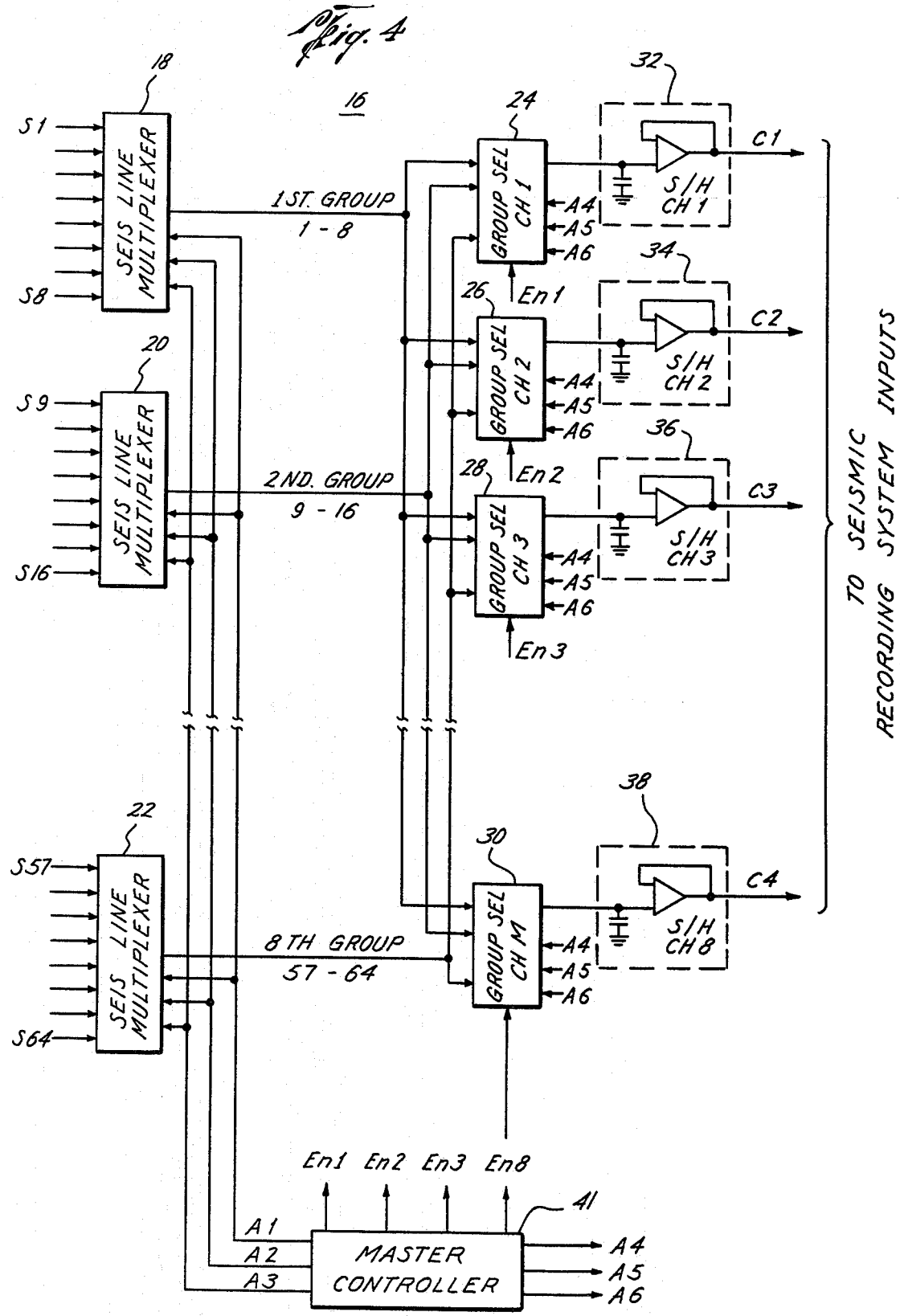

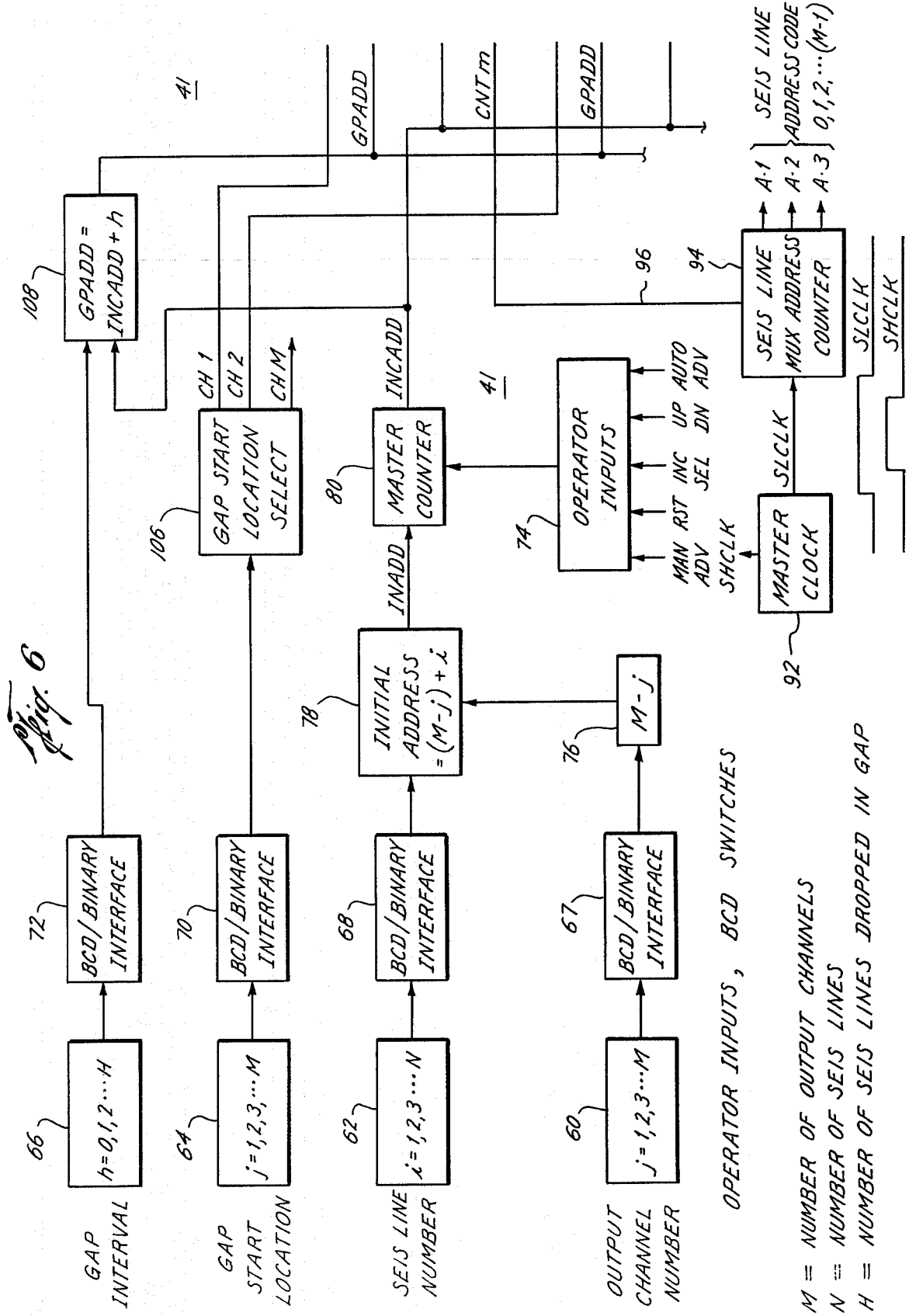

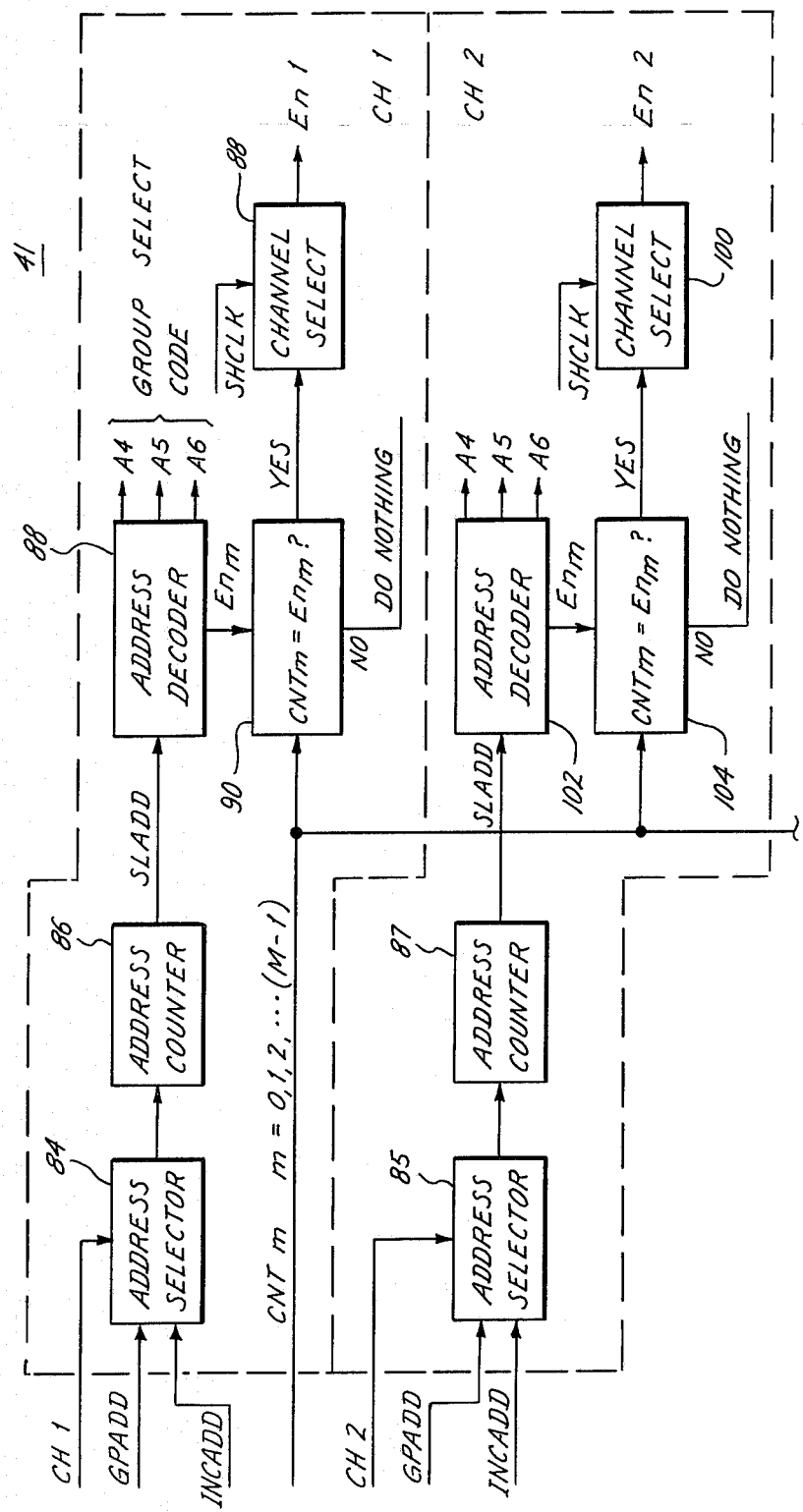

ROLL-ALONG SWITCH

BACKGROUND OF THE INVENTION

1. Field of the Invention

This invention is related generally to seismic data acquisition systems and more particularly to systems for use in Common Depth Point profiling. The invention is concerned with a solid-state electronic roll-along switch for sequentially connecting successive subpluralities of seismic detectors to a set of recording channels.

2. Description of the Prior Art

Common depth point (CDP) profiling is standard practice in seismic exploration for hydrocarbons. CDP methods are described in numerous patents and technical papers such as U.S. Pat. Nos. 2,732,906 to Mayne, 3,317,828 to Mendenhall, 3,240,286 to Musgrave, 3,775,738 to Quay, and many others.

To review briefly, a large number of seismic detector groups, on the order of several hundred, are distributed in a spread along a line of survey. The detector groups, located at desired stations, are generally separated by uniform group intervals such as 100 meters. A recording unit such as a truck is provided that houses a data acquisition system that includes a number of signal processing and recording channels, usually between 50 and 100 such channels. An acoustic source, mounted on a suitable vehicle, accompanies the recording vehicle.

The recording unit and the source occupy a first recording station. A subplurality of seismic detector groups, usually equal to the number of recording channels, are coupled to the respective channels by suitable electrical connectors. The source radiates an acoustic signal into the earth and a first recording is made of the reflected seismic signals. The recording and source vehicles advance to the next recording station where a second recording is made. The vehicles continue to advance along the line of survey after each recording until the line of survey is completed. The distance between recording stations is usually a multiple of the detector-station spacing. At each new station, the recording channels are disconnected from the previously-connected subplurality of seismic detectors and are connected to a new subplurality. If the separation between recording stations is for example, equal to one group interval, for each subsequent recording, one group is disconnected behind the recording vehicle and a new detector group is connected ahead of the recording vehicle in the direction of advance.

It is, of course, possible to connect and disconnect the detector groups by means of suitable multiconductor plugs at the recording vehicle itself. The recording vehicle would be obliged to physically proceed down the line of survey, stopping at each recording station. It is more practical however, to locate the recording vehicle at a fixed location at one end of the spread and to advance the recording channels along the detector spread electrically, by use of a roll-along switch. In this arrangement, only the acoustic source is advanced along the spread.

Roll-along switches are available commercially from such suppliers as Geospace Inc., or Input-Output, Inc., both of Houston, Tx. Known roll-along switches are mechanical and are operated either by hand or by means of a stepping motor. In general, such switches consist of a movable contact block having contact pairs equal in number to the number of recording channels. The movable contact block mates with a stationary contact block which includes a plurality of mating contact pairs that are connected to the corresponding detector group. A typical roll-along switch might include forty eight contact pairs for the movable block and 196 contact pairs for the stationary block. After each recording is completed, the movable contact block is incrementally shifted one or more detector groups relative to the stationary contact block.

Because of the large number of contacts involved, a considerable amount of friction must be overcome when shifting the movable contact block relative to the stationary block. Automatic switches require relatively complicated shifting mechanisms. Being mechanical, the switch contacts are subject to wear and corrosion. When used in hostile climates, sand, dirt and moisture cause frequent switch malfunctions and often create serious interchannel crossfeed between contacts. Mechanical roll-along switches are also very difficult to repair in the field.

Constraints on the physical size of the switch, limit the number of seismic detector input channels that can be accomodated by a mechanical switch. Known switches provide for about 196 input channels whereas facilities for use with up to 512 input channels or more and up to 120 recording channels are desired. The sheer bulk of such a large number of contacts precludes use of a mechanical switch having such high contact multiplicity. Commercially available roll-along switches are large, heavy and awkward to handle. One such commercial unit having but 196 input channels weighs over 60 pounds.

SUMMARY OF THE INVENTION

It is an object of this invention to provide a lightweight, compact electronic roll-along switch capable of accommodating a large number, i.e. in excess of 500, seismic detector input channels.

In a preferred embodiment of this invention, the roll-along switch includes several seis-line input multiplexers. Each multiplexer has an output line and a number of input channels preferably equal to the number of recording channels that are contained in a multichannel seismic recording system to which the roll-along switch is connected. The cumulative total number of input channels provided by the several multiplexers is equal to the total number of seismic detectors disposed along the spread. All of the seis-line multiplexers may be advanced in unison to connect individual detectors of successive sets of seismic detectors to the output line in a desired sequence by a multiplexer clock at desired multiplex intervals.

A plurality of multiple-input sample-and-hold modules, equal in number to the number of recording channels, are provided. Corresponding inputs of each of the sample-and-hold modules are connected in parallel. There are as many inputs for each sample-and-hold module as there are input multiplexers. The output lines of the several input multiplexers are connected to the respective paralleled inputs of the respective sample-and-hold modules in consecutive order. In synchronism with the multiplexer clock, a selected input line is sampled by each sample-and-hold module in consecutive order.

In an aspect of this invention, each sample-and-hold module includes group-select and sample switches. Each module is assigned a positional ordinal number code corresponding to the seismic recording channel number to which it is connected. An initial address code is formed which defines the seismic detector number that is to be initially connected to a specified recording channel. Seis-line address codes are formed by adding the ordinal number code to the initial address. The seis-line address code is decoded in the sample-and-hold module to provide a group-select code and a sample-enable code. The group-select code selects a particular input of the sample-and-hold modules; the sample-enable code activates the sample switch of a particular sample-and-hold module.

In another aspect of this invention, different sets of seismic detectors are progressively connected to the seismic recording system by incrementing the initial address code by a desired integer value.

In yet another aspect of this invention a selected set of contiguous detectors is separated into two parts to provide a gap therebetween. A first seis-line address is selected to define the last seismic detector in the first part. An integer increment, equal to the number of detector intervals to be skipped, is added to the first seis-line address to form a second seis-line address that defines the first detector of the second part of the detector set and pushes down all subsequent seis-line addresses of the second part of the detector group.

In a further aspect of this invention, the multiplexer interval is at least four times as short as the shortest sample interval employed by the seismic recording system.

BRIEF DESCRIPTION OF THE DRAWINGS

The benefits and advantages of this invention will be better understood by reference to the appended detailed description and the drawings wherein:

FIG. 1 is a showing of the roll-along principle as applied to common depth point surveys;

FIG. 2 illustrates a gapped spread;

FIG. 3 shows the manner of "rolling-on" to a spread;

FIG. 4 is an overall showing of the roll-along switch function;

FIG. 6 is a showing of the operator interface portion of the master controller; and FIG. 7 is a logic diagram illustrating the manner of generating multiplexer and sample-switch address codes.

DETAILED DESCRIPTION OF THE INVENTION

Figure 5:
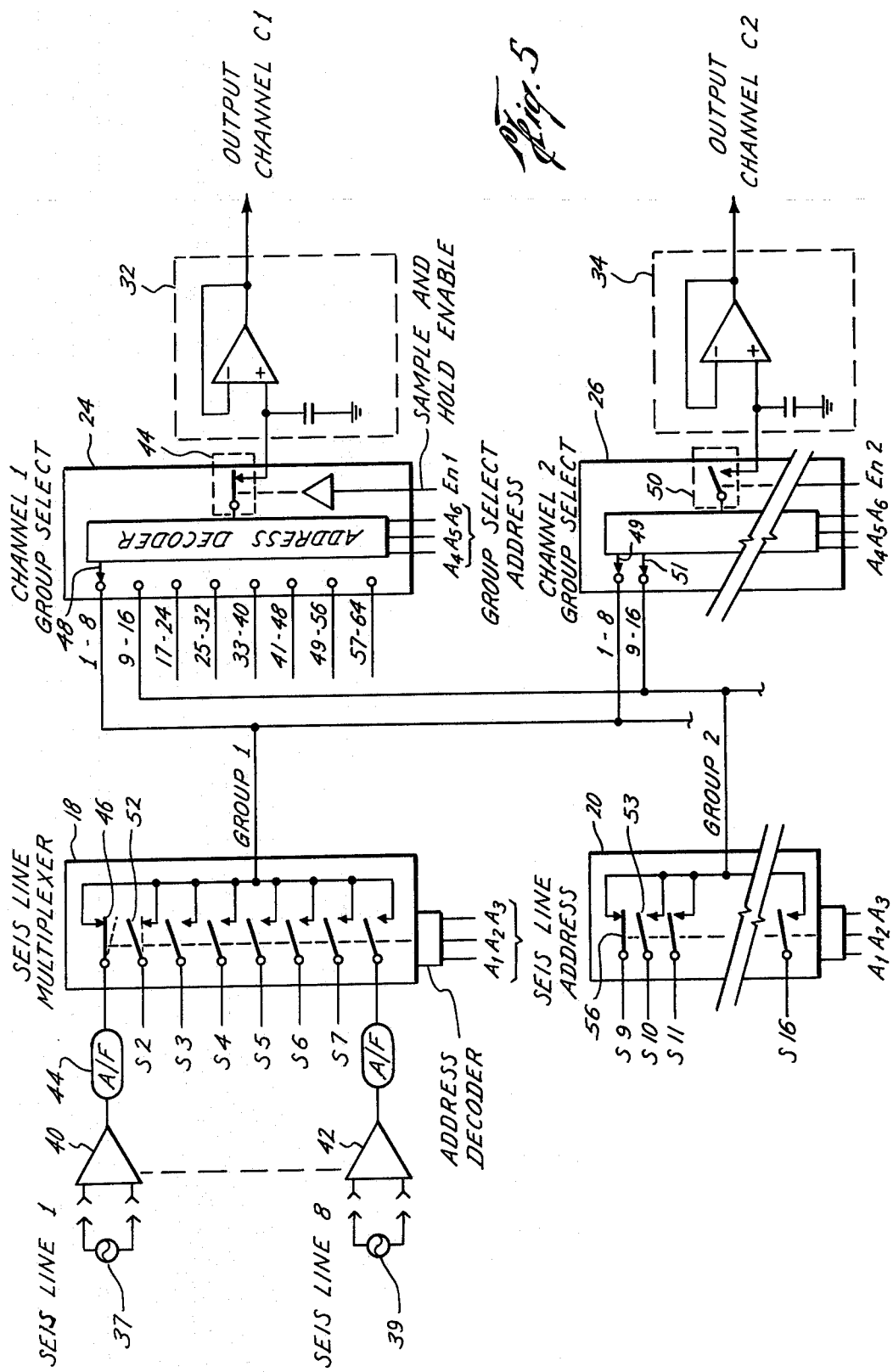
FIG. 5 is a detailed showing of the switching actions for the first two channels.

FIG. 1 illustrates a typical field setup wherein a detector spread having a plurality of detectors D1 through D64 is connected by a multiconductor cable 10, having a plurality of seis-lines contained therein, to a recording vehicle such as a truck 12. Installed in recording vehicle 12, are a set of recording channels C1–C8 located in the dashed box 14.

As the survey is begun, channels C1–C8 are connected to a set of seismic detectors or detector arrays D1–D8 by seis-lines S1–S8 and a recording is made. It should be understood that although channels C1–C8 are shown illustratively as being located at the left end of the spread, they are in actual fact placed inside box 14 in truck 12. The channels are connected to the respective seis-lines, which are actually contained in cable 10 through roll-along switch 16 also located in the truck. After the first recording, channels C1–C8 are connected to seis-lines S2–S9 by roll-along switch 16 for the second recording. For each subsequent recording, the channels are advanced by roll-along switch 16 S3–S10, S4–S11, etc. and finally to S57–S64.

FIG. 2 illustrates a gapped spread. In FIG. 1, channels C1–C8 were connected in numerical order to the respective detectors in a selected group. In many operations, an acoustic source may be located at the approximate center of an active spread. An inherently noisy device, the acoustic source may unduly disturb nearby seismic detectors. Accordingly, it is customary to disconnect one or more detectors from that portion of the active spread that is occupied by the acoustic source. The region encompassed by the disconnected or skipped detectors is termed a gap. As shown in FIG. 2, channels C1–C4 are connected in numerical order to detectors D1–D4. However, channels C5–C8 are connected to detectors D7–D10, leaving a gap where D5 and D6 are disconnected.

At the beginning or end of the seismic line of survey, the recording channels may be rolled on or off the spread. In FIG. 3, as the recording unit approaches the spread, the recording channels are connected in inverse numerical order to the detectors. First C8 is connected to detector D1, then C7 and C8 are connected to detectors D1 and D2, etc. until finally C1–C8 are connected to D1–D8 as shown at the left end of FIG. 1. The reverse process then takes place at the far end of the spread as the recording truck moves away.

The principles of operation of a solid-state roll-along switch 16 will now be discussed in connection with FIG. 4.

Essentially, the switch system consists of a set of seis-line input multiplexers 18, 20, 22 that are connected to a set of group-selector circuits 24, 26, 28, 30, each of which includes a sample switch (not shown in FIG. 4). To the sample switch of each group-selector circuit there is coupled a sample-and-hold output amplifier channel such as 32, 34, 36, 38. The outputs of the sample-and-hold amplifiers are connected to corresponding recording channels of a conventional multichannel seismic recording system of any desired type. A master controller and an operator interface, to be discussed in detail below in connection with FIGS. 6 and 7, provide clock pulses, seis-line addresses for multiplexers 18–22, group-select address codes to group-selector circuits 24–30 and channel-enable pulses to the sampling switches in the group-selector circuits.

The above enumerated components will now be explained in detail, referring to FIGS. 4 and 5.

Each seis-line input multiplexer such as 18 preferably has as many input lines as there are output amplifier channels. However, in very large systems operating at a very short sample rate the number of input lines furnished with a commercial multiplexer module may be insufficient to accommodate the total number of output channels. In such an event of course, a single large-capacity multiplexer may be built up by ganging together two or more smaller-capacity modules. The seis-line input multiplexers provide the capability for connecting in sequence, any desired set of eight detectors to the eight exemplary amplifier output channels. In FIG. 4, eight input lines per multiplexer and eight amplifier output channels are shown. Any number of input lines and any number of output channels could be used per multiplexer such as 12, 24, or 48. A sufficient number of seis-line input multiplexers are employed to accommodate the total number of seismic detector groups to be included in a desired spread layout. In FIG. 4, 64 input seis-lines are shown but as many as 480 or more such lines may be employed. In the illustrative example, having 64 input seis-lines with eight channels per seis-line multiplexer, eight multiplexers are required. The 64 seis-line input channels are thus divided into eight groups of eight channels each. Larger systems employing 24 output amplifiers and 480 input lines might involve 20 such groups. A convenient multiplexer is the DG508 analog switch made by Siliconix of Santa Clara, Calif.

Referring to FIGS. 4 and 5, each of the eight input lines is individually addressable by a three-bit address code transmitted over lines $A_1$, $A_2$, $A_3$ from controller 41, in parallel, to each of the eight input multiplexers. During a recording cycle of, for example, 6 seconds, the input multiplexers such as 18, 20, 22 repeatedly execute a multiplexer scan cycle at multiplexer sample intervals such as 0.25 second. During each interval, each of the eight input lines of the eight multiplexers are sampled in sequence in accordance with the address code that is transmitted at each clock count. At the first count of a scan cycle the address code for $A_1$, $A_2$, $A_3$ is 000. That address code activates the first multiplexer switches such as 46 and 56 of multiplexers 18 and 20 (and similarly for the remaining six input multiplexers) in unison. For the second count, the address code is 001 which activates switches 52 and 53 and deactivates switches 46 and 56. The process continues and for the eighth count the address code is 111, activating the eighth multiplexer switches such as 51, multiplexer 18. At the end of a scan cycle, the address codes repeat.

Electronic switches are inherently noisy devices when used with low-level signals such as seismic signals. Accordingly, each pair of seismic detector-group leads from detectors 37, 39 are connected to a corresponding differential-input preamplifier such as 40, 42, FIG. 5, having a single-ended output. The gain of the preamplifiers such as 40, 42 is selectable, with a gain of $\times 128$ being preferred. At the preferred gain level, the analog signal at the switch input is relatively large and the switching transients become inconsequential. An alias filter such as 44 is connected between the output of each preamplifier 40 and the input lines to seis-line multiplexer 18. The cutoff frequency of the alias filter is commensurate with the sample rate of the seis-line input multiplexer itself. Although only two preamplifiers and alias filters are shown, connected to seis lines 1 and 8 respectively, it should be understood that all of the input seis lines are also so equipped.

The seis-line multiplexer outputs are connected to the respective parallelled inputs of the group-selector switches 24–30. The number of input lines to the group-selector switches may be equal to the number of seis-line multiplexers or a multiple thereof. In the exemplary system as shown in FIGS. 4 and 5, there are eight seis-line multiplexers having eight input channels each, namely: 1–8, 9–16, . . . , 57–64. There are, therefore eight groups. The group-selector switches also are conveniently DG508 modules. A three-bit group select code $A_4$, $A_5$, $A_6$ controls the switch closure for a desired group. Sample switches such as 44 and 50 (FIG. 5) are provided for each group selector switch such as 24, 26. A sample switch such as 44 is actuated by an enable pulse code over enable lines such as lines EN1 and EN2. Similarly the sample switches associated with the remaining group selector switches are actuated by corresponding enable pulse codes EN3–EN8. In combination with output amplifier circuit 32, group-selector switch 24 and sample switch 44 constitute a multiple-input sample-and-hold module that is connected to a recording channel of a multi-channel recording system. Although an enable switch similar to switch 44 is included in seis-line multiplexers 18–22, those switches are hard-wired closed at all times and hence are not shown.

The group select code for group 1, that is, input channels S1–S8, is 000, which activates the first switches such as 48 and 49 of group selectors 24 and 26 and similarly for the remaining group selector switches. A group select code of 001 addresses inputs of the second group, including input lines 9–16. If input seis lines S1–S8 corresponding to detectors set D1–D8 are to be connected to output channels C1–C8, the group select code of 000 remains constant for an entire recording cycle. If input lines S2–S9 are to be coupled to output channels C1–C8, then a group select code of 000 will be transmitted for the first seven counts of a scan cycle and at the eighth count the group select code will change to 001 in order to activate the second group select switch such as S1 to enable group 2 which includes seis-line S9, which will be connected to channel C8. The above combination of group select codes remains the same for every scan cycle of an entire recording cycle wherein the set of detectors D2–D9 are to be sampled.

The enable pulse code EN ranges from 000 for the first count to 111 for the eight count of a multiplexer scan cycle. The enable pulse code is paired with the seis line address cycle $A_1$, $A_2$, $A_3$. Thus for detector set D1–D8, to be connected to channels C1–C8, at the first count of a scan cycle, the address code of 000 activates switches 46 and 56 of multiplexers 18, 20 (and similarly for the remaining six multiplexers). But the enable pulse code for the first count is EN1=000 and hence only sample switch 44 is activated. The signal on seis line S1 is therefore sampled and is transmitted to output channel C1. At the second count, the address code of 001 activates switches 46, 56 and deactivates switches 52 and 53. At the same time, enable pulse code EN2=001 is transmitted. EN2 activates only sample switch 50, thereby connecting input seis line S2 to channel C2.

Operation of the roll-along switch is controlled by the master controller 41 with the aid of operator input commands. The master control circuitry will now be described with reference to FIGS. 6 and 7. FIG. 6 illustrates the logic involved in the master controller and the operator input switches. FIG. 7 represents the control logic that defines which input seis line is to be coupled to a particular output channel such as C1 and C2. The control logic for each of the remaining channels C3–C8 is identical to the logic for C1, C2 control and is not shown.

The operator first enters an initial seis-line or detector number N that is to be coupled to a selected output channel number M to provide an initial group address selection. Ordinarily, at the beginning of a seismic line, detector D1 may be associated with output channel C1. These two entries are introduced by means of BCD thumbwheel switches 60, 62 of any well known type. Of course, if it is desired to roll on to the spread, detector D1 could be connected to output channel C8. See FIGS. 1 and 3. Referring to FIGS. 2 and 6, if a gap is to be provided, the channel number M at which the gap is to begin is entered via thumbwheel switch 64; the number H of detectors to be dropped or skipped is entered through thumbwheel switch 66. BCD-binary interfaces 67, 68, 70, 72 convert the BCD thumbwheel outputs to binary notation.

Other operator inputs are inserted by suitable switches through operator interface 74. MAN ADV is a push-button switch allowing the operator manually to advance the roll-along switch system one detector group at a time. With AUTO ADV activated, the switch will advance along the spread automatically after each recording episode. INC SEL, increment select, defines the number of detectors to be skipped for each advance. The least setting would ordinarily be a setting of 1 unless the operator chooses to occupy the same spread position for several recording episodes in which case INC SEL would be zero. UP/DN defines the direction of advance along the spread, i.e. in the direction of either increasing or decreasing detector numbers. Finally RST resets the system to the initial input settings.

Ignoring for the moment the circuitry in the upper right hand part of FIG. 6 for creating a gapped spread, the master controller 41 provides a unique binary address that identifies the initial detector of a set of detectors that is to be coupled to a specific output amplifier and provides means for incrementing that address as the output amplifiers are advanced along the spread. As a numerical example, assuming that there are eight output channels and that it is desired during the first recording episode to connect seis-line S1 from detector D1 to output channel C1, the initial address is generated as follows: Thumbwheel switches 60, 62 would both be set to 1, that is, $i=j=1$, and $M=8$. The initial adress is formed by subtracting j from M in subtractor 76 and adding i to the difference in adder 78, yielding an initial address code INADD=8. Note that M is hard-wired in subtractor 76 for any given system having M output channels. In this example, INADD is a 8-bit address code represented by binary 00001000. Address increment register 80 adds a number equal to INC SEL, that is, the number of detector groups to skip for each advance, to the initial address code each time the roll-along switch is advanced along the spread. Initially since there is no advance, the contents of master counter 80 are 0 and INCADD, the incremented address, at the output of master counter 80 is equal to INADD or 00001000.

Let us digress now from the numerical example, to a functional description of FIG. 7. We shall return to the numerical example later. Referring now to FIGS. 6 and 7 the incremented address, INCADD, is transmitted in parallel to address selectors such as 84, 85; FIG. 7; for the moment ignore their presence. A hard-wired channel-number corresponding to the ordinal number assigned to each of the output channels C1–C8 is added to INCADD in address counters 86, 87 to derive individual seis-line address codes SLADD. The seis-line address code defines which input seis line will be connected to a specified output channel. In the exemplary system having eight output channels, the channel number code ranges sequentially from 000 (binary zero) for channel C1, to 111 (binary seven) for channel C8. Accordingly, in the first roll-along positon, the seis-line address code for output channel C1 is 00001000+000=00001000; for output channel C2, the code is 00001000+001=00001001, and similarly for the remaining channels.

The seis-line address code SLADD is applied to an address decoder 88 which may be a read only memory (ROM). Address decoder 88 contains a table of the group-select codes $A_4$, $A_5$, $A_6$ and a sample-switch enable code $EN_m$ that corresponds to each channel address code, in accordance with the truth table below. The group-select code ranges from 000 to 111.

| Seis Line Number | Address Decoder Truth Table | | |
|---|---|---|---|
| | SLADD | $A_4\ A_5\ A_6$ | $En_m$ |
| 1 | 00001000 | 0 0 0 | 000 |
| 2 | 00001001 | 0 0 0 | 001 |
| ... | ... | ... | ... |
| 8 | 00001111 | 0 0 0 | 111 |
| 9 | 00010000 | 0 0 1 | 000 |
| 10 | 00010001 | 0 0 1 | 001 |
| ... | ... | ... | ... |
| 16 | 00010111 | 0 0 1 | 111 |
| 17 | 00011000 | 0 1 0 | 000 |
| 18 | 00011001 | 0 1 0 | 000 |
| ... | ... | ... | ... |
| 24 | 00011111 | 0 1 0 | 111 |
| ... | ... | ... | ... |
| 57 | 01000000 | 1 1 1 | 000 |
| 58 | 01000001 | 1 1 1 | 001 |
| ... | ... | ... | ... |
| 64 | 01000111 | 1 1 1 | 111 |

Inspection of the truth table reveals that seis line S1 corresponds to a seis-line address code of binary eight. (The purpose of assigning a code of eight is to make provision for the system to roll onto the spread.) For the first block of eight seis-line address codes, the group-select code is 000 so that the first set of input seis lines S1–S8 (FIG. 6) to which a set of detectors D1–D8 is connected, is selected. The channel enable code $EN_m$ increments from 000 to 111, as the seis line number ranges from S1 to S8, thereby connecting channels C1–C8 to the respective seis lines S1–S8. The subscript m is a running index associated with the mth group-selector multiplexer.

When the seismic recording system has advanced eight intervals along the spread to detector group D9–D16, the seis line address code ranges from binary 16 to binary 23. For this block of eight address codes, the group select code is incremented to 001 thereby to select seis line groups S9–S16 and $EN_m$ again repeats its count from 000 to 111 to connect seis lines S9–S16 to output channels C1–C8. The remaining seis-line address codes are similarly decoded.

As discussed above, the group select code $A_4$, $A_5$, $A_6$ enables the corresponding group select switches. The channel enable code $EN_m$ provides channel selection as follows: The code $EN_m$ becomes one input to a comparator such as 90 and 104. A master clock 92 is provided. Master cock 92 sends a seis-line clock pulse, SLCLK, 10 µs long to seis line multiplexer counter 94 causing the counter to send seis-line address codes $A_1$, $A_2$, $A_3$ in parallel to the seis-line input multiplexers 18, 20, 22 (FIG. 4). Counter 94 also sends a three-bit count code $CNT_m$ which is sent in parallel to the second inputs of comparators 90, 104. $CNT_m$ as well as $A_1$, $A_2$, $A_3$ range from 000 to 111. The count sequence repeats continuously as long as a recording operation is in process. Master clock 92 also emits a sample-and-hold clock pulse, SHCLK, 2 µs after SLCLK. SHCLK is 6 µs long. SHCLK is paralleled to one input of channel selectors 88, 100. It is to be understood that SLCLK, seis line clock, advances all of the seis-line multiplexers in unison. That is, each SLCK pulse switches the outputs of all of the seis-line multiplexers simultaneously from one input channel to the next until the last channel and then repeats. But a particular input is connected to a particular amplifier output channel only when $En_m = CNT_m$ for that particular clock cycle.

As pointed out above, the two inputs to a comparator such as 90 are $EN_m$ and $CNT_m$. If $EN_m = CNT_m$, the output of comparator 90 goes true and sends a pulse to channel selector 88. Upon the arrival of a SHCLK pulse at channel selector 90, EN1 goes true to activate sample-and-hold switch 44 of channel C1. If $CNT_m$ does not equal $EN_m$, the comparator does nothing.

Returning now to the numerical example, the seis line address code for seis line S1 at address counter 86 is 00001000 and the channel number code for channel C1 is 000. Therefore, the sum is a binary 8. From the truth table, if SLADD is binary 8, $A_4$, $A_5$, $A_6$ is 000 and $EN_m$ is 000. For the first count of an eight-count seis-line multiplexer cycle, the codes for $CNT_m$ and $A_1$, $A_2$, $A_3$ are 000. $EN_m = 000$ is now compared with $CNT = 000$ in comparator 90. Since they are equal, channel select 88 sends an EN1 pulse to group selector 24, FIGS. 4 and 5, and channel C1 is enabled, by switch 44 (FIG. 5), coupling seis line S1 to output channel C1 as desired.

For channel C2, the channel number code in address counter 87 is 001. Accordingly the seis-line address code is a binary 9 or 00001001. From the truth table for SLADD = 00001001, $EN_m$ is 001. At the first count of an eight-count scan cycle, the $EN_m$ input to comparator 104 for channel 2 is 001 but $CNT_m$ is 000. Since the two codes are not alike, comparator 104 does nothing. On the second count of an 8-count scan cycle however, $CNT_m = 001$. Now, since $EN_m = CNT_m$, channel selector 100 sends an EN2 pulse to group selector switch 26 so that seis line S2 will be connected to channel C2. Similarly the remaining seis lines will be connected to the corresponding channels.

So far in the discussion, it has been assumed that seis input lines S1–S8 were to be coupled to channels C1–C8 on a one-to-one basis. At the end of the recording operation in that position, the recording channels are rolled along so that seis input lines S2–S9 are to be coupled to output channels C1–C8. For the second position, master counter 80 increments the initial address which was INADD = 00001000 to generate INCADD = 00001001, assuming that the operator specified an advance of one detector position. For channel 1, the channel numbe code in address counter 86 is 000 so SLADD becomes 001001 for output channel 1. The group select code remains 000 so that group one is selected. From the address decoder truth table, $EN_m$ to comparator 90 will now be 001. The first count of an eight-count scan cycle will generate a seis-line address code $A_1$, $A_2$, $A_3$, and a count code, $CNT_m$, both equal to 000. A seis line address code of 000 connects seis line S1 to multiplexer 18, FIG. 5. But since the count code $CNT_m = 000$ does not match the enable code $EN_m = 001$, comparator 90 will do nothing. The second count of seis line counter 94 generates a seis-line address code and a count code $CNT_m$ of 001, thereby connecting seis line S2 to multiplexer 18. Since the count code $CNT_m$ is now 001, it will be equal to $EN_m$ which is also 001, and comparator 90 will cause channel select 88 to send an EN1 pulse to group selector 24 when a SHCLK is received, thereby closing the sample-and-hold switch 44 and connecting seis line S2 to output channel C1 a required. The remaining channels are sequenced similarly until seis line S9 is connected to channel C8.

Under some conditions, it is desired to introduce a gap in the seismic detector group as shown and described in connection with FIG. 2, that is, the group is subdivided into two parts. The gap parameters are introduced via thumbwheel switches 64 and 66 through BCD/binary interfaces 70, 72. Gap start location selector 106 in combination with address selectors 84, 85 designates the channel number at which the gap is to start. For all channels ahead of the gap, the appropriate address select registers are switched to receive INCADD. At the gap start channel, INCADD is incremented by the number of seismic detector groups to be dropped to generate GPADD, gap address in gap address register 108 and the address select registers after the gap-start channel are switched to accept GPADD in place of INCADD. In effect, beyond the gap, the previous addresses are pushed down or incremented by the number of detector stations in the gap.

The roll along switch of this invention involves a multiplexing operation. It is designed to be employed with a conventional multichannel digital seismic recording system which itself employs a multiplexer device. The sample rate of most seismic systems ranges from one to four milliseconds. Accordingly the sample rate of the seis-line input multiplexers of the roll-along switch should be at least two to ten times faster than the sample rate of the recording system. A preferred sample rate is 0.25 ms.

I claim as my invention:

1. A roll along switch for sequentially connecting successive sets of seismic detectors, each set having a desired number of seismic detectors selected from a plurality of such detectors, to a like desired number of recording channels of a multichannel recording system comprising:

a plurality of seis-line input multiplexers each having a number of input channels and an output line, each said input channel being connected to one of said plurality of seismic detectors;

a plurality of multiple-input sample-and-hold modules having an output coupled to each said recording channel, the number of inputs being equal to the number of seis line input multiplexers, corresponding inputs of said multiple-input sample-and-hold modules being connected in parallel, the output line of each one of said seis-line input multiplexer being coupled to a corresponding one of the paralleled inputs of said sample-and-hold modules in consecutive order;

means cooperating with said seis-line input multiplexers and said multiple-input sample-and-hold modules, for selectively coupling a desired set of seismic detectors to said recording channels;

group-select and sample switches associated with each said sample-and-hold module;

means for forming an initial address code;

means for assigning an ordinal channel-number code to each said sample-and-hold module and its associated output channel and means for summing said initial address with said ordinal number code to form a seis-line address code;

means for decoding said seis-line address code into a corresponding group-select code and a sample-enable code; and means for addressing the group select switches of said sample-and-hold modules so that said group-select code enables a selected one of the input channels of each said sample-and-hold module and said sample-enable code enables the sample switch of a selected one of said sample-and-hold modules.

2. A roll-along switch for connecting a first desired set of seismic detectors, selected from a plurality of such detectors disposed at intervals along a line of survey, to a multichannel recording system having a desired sample interval, comprising:
- a plurality of seis-line input multiplexers, each having a number of input lines and an output line, each input line of the respective input multiplexers being connected to a different one of said plurality of seismic detectors;
- means for advancing in unison said input multiplexers to connect in turn, each said input line to the output line of the respective multiplexers at desired multiplex intervals;
- a plurality of multiple-input sample-and-hold modules, each having an output couplable to corresponding channels of said multichannel recording system, the respective inputs of each said sample-and-hold module being connected in parallel, the output lines of the respective seis-line input multiplexers being connected in consecutive order to corresponding ones of the paralleled inputs of said sample-and-hold modules;
- means synchronized with said input-multiplexer advancing means, for sampling in consecutive order the signal present on the input lines of each said sample-and-hold module;
- group-select and sample switches associated with each said sample-and-hold module;
- means for forming an initial address code;
- means for assigning an ordinal channel-number code to each said sample-and-hold module and its associated output channel and means for summing said initial address with said ordinal number code to form a seis-line address code;
- means for decoding said seis-line address code into a corresponding group-select code and a sample-enable code; and
- means for addressing the group select switches of said sample-and-hold modules so that said group-select code enables a selected one of the input channels of each said sample-and-hold module and said sample-enable code enables the sample switch of a selected one of said sample-and-hold modules.

3. The roll-along switch as defined in claim 2 wherein the number of input lines assigned to each said seis-line input multiplexer is equal to the number of multiple-input sample-and-hold modules and the number of input channels assigned to each said multiple-input sample-and-hold module is equal to the number of seis-line input multiplexers.

4. The roll-along switch as defined in claim 2 further comprising:
- means for connecting a second desired set of seismic detectors, displaced from said first set by a predetermined number of seismic detector intervals, to said multichannel recording system by adding an integer increment to said initial address so that other desired input channels of each said sample-and-hold module are sampled in consecutive order.

5. The roll-along switch as defined in claim 4 wherein means are provided for subdividing a selected set of seismic detectors into two parts, the two parts being separated by a predetermined number of seismic detector intervals to provide a gap therebetween, said subdividing means comprising:
- means for selecting a first seis-line address identifying the last seismic detector of the first of said two parts relative to the direction of advance, and means for adding an address increment to said seis-line address to form a new seis-line address that defines the first detector of the second part of said set, the address increment being an integer equal to the desired number of detector intervals in said gap.

6. The roll-along switch as defined in claim 2 wherein the desired multiplex intervals are at least two times shorter than the shortest sample interval of said multichannel seismic recording system.

7. The roll-along switch as defined in claim 2 wherein the initial address code defines the seismic detector number of the first detector of a selected set of detectors that is to be connected to a specified recording channel of said multichannel seismic recording system.

8. A roll-along switch for sequentially connecting desired successive sets of seismic detectors, selected from a plurality of such detectors, to a multichannel data acquisition system, comprising:
- a first multiplexing stage having a plurality of inputs coupled to the plurality of detectors and having a lesser plurality of outputs;
- a second multiplexing stage having a plurality of inputs coupled to the outputs of said first multiplexing stage and having a number of outputs equal to the number of channels in the multichannel data acquisition system;
- means for advancing the first multiplexing stage at desired intervals;
- group select switches associated with the inputs of said second multiplexer stage and signal-sampling switches associated with the outputs of the second multiplexer stage;
- means for forming a seis-line address code;
- means, associated with said second multiplexer stage, for decoding the seis-line address code into a group-select code and a sample-enable code;
- means for applying the group select code to the group select switches to select a desired set of seismic detectors; and
- means for applying the sample-enable code to the signal-sampling switches to sample at desired intervals the signal present at the inputs of the second multiplexer stage.

* * * * *